United States Patent [19]

Zajdman et al.

[11] Patent Number: 5,099,492
[45] Date of Patent: Mar. 24, 1992

[54] LASER SYSTEM

[75] Inventors: Avigdor Zajdman; Oded Amichai, both of Haifa, Israel

[73] Assignee: Optomic Technologies Corporation, Ltd., Migdal Haemek, Israel

[21] Appl. No.: 499,976

[22] Filed: Mar. 27, 1990

[30] Foreign Application Priority Data

Mar. 28, 1989 [IL] Israel ......................................... 89781

[51] Int. Cl.⁵ ............................................. H01S 3/081
[52] U.S. Cl. ........................................ 372/99; 372/66; 372/61; 372/87; 372/88
[58] Field of Search ..................... 372/99, 94, 108, 66, 372/95, 61, 88, 87, 67

[56] References Cited

U.S. PATENT DOCUMENTS

| | | | |
|---|---|---|---|
| 3,969,687 | 7/1976 | Freiberg et al. | 372/66 |
| 4,050,036 | 9/1977 | Chambers et al. | 372/66 |
| 4,164,366 | 8/1979 | Sziklas et al. | 372/108 |
| 4,190,814 | 2/1980 | Van Workum | 372/108 |
| 4,514,850 | 4/1985 | Holmes et al. | 372/108 |
| 4,744,090 | 5/1988 | Freiberg | 372/108 |

Primary Examiner—Frank Gonzalez
Assistant Examiner—Susan S. Morse
Attorney, Agent, or Firm—Oblon, Spivak, McClelland, Maier & Neustadt

[57] ABSTRACT

A compact RF excited annular laser system has a stable resonator with a high quality output beam. The stable resonator has internal axiconical and annular mirrors to conform with the annular lasing medium, and to convert the annular beam into a compact cylindrical beam. Mode control is achieved by a combination of diffractive effects in both the annular beam and the compact beam.

8 Claims, 5 Drawing Sheets

FIG.5A
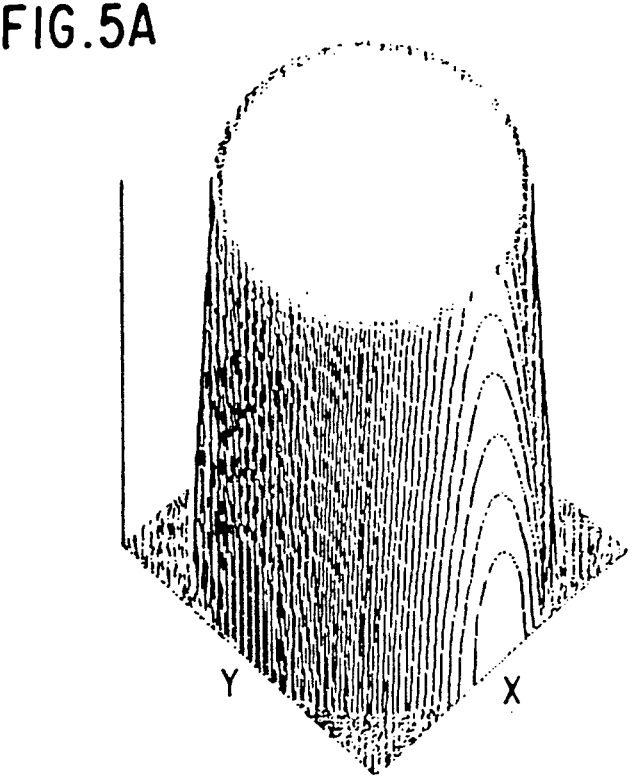
FAR FIELD
INTENSITY DISTRIBUTION
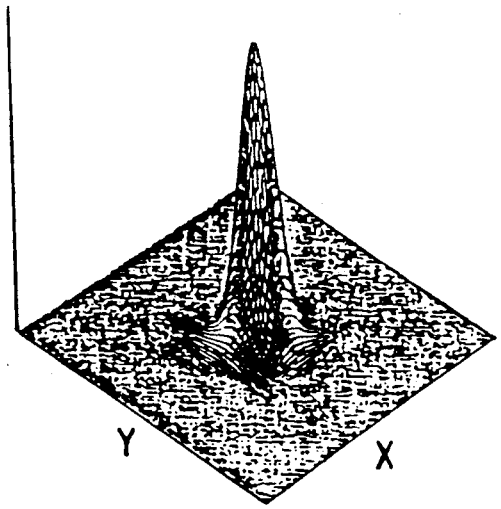
FIG.5B
NEAR FIELD
INTENSITY DISTRIBUTION
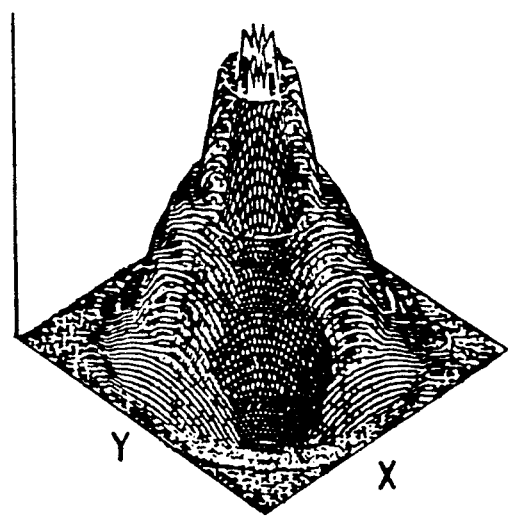
FIG.5C

LASER SYSTEM

FIELD OF THE INVENTION

The invention relates to improved stable optical resonators which are of special value in laser systems. According to the invention there is provided a stable resonator for an annular configuration of the lasing medium in a laser system, in which there is used as an intracavity element a two stage waxicon or axicon. The novel system has a number of advantages, one of these being the achievement of stable operation with a compact, cylindrical, non-annular high-quality output beam.

DESCRIPTION OF THE BACKGROUND

In a variety of lasers an annular cylindrical configuration of the lasing medium is used. This has pronounced advantages especially in high power lasers (chemically, electrically or optically pumped). The annular configuration makes possible a compact design, efficient gas cooling, gas renewal, a pumping uniformity, etc. The annular configuration has the drawback of complicating the generation of single low order transverse mode operation where a compact beam region is required where the mode originates on the axis. By feedback, the mode in the compact region controls the radiation in the annular region.

One way of obtaining a central beam region where a low order single transverse mode may be attained is to use an additional intracavity element of the axicon or waxicon type which transforms the annular beam into a compact cylindrical one, or vice versa. Unstable resonators, in which there are used axicons or waxicons as intracavity elements, are well known. Such unstable resonators are very sensitive to optomechanical instabilities and to misalignments of optical elements. This sensitivity is a serious problem, especially with industrial lasers which are operated under severe environmental conditions. Hitherto one of the means of overcoming this sensitivity was to replace the flat feed-back mirror by a corner retroreflector, which reduces the optical alignment sensitivity by one or two orders of magnitude. With industrial lasers of the $CO_2$ type, which have a large volume and a high power output, the use of such a corner retroflector may be expensive. For a relatively short-gain medium unstable resonators are not well suited. The low output coupling coefficient which is required causes two problems:

(i) Degraded transverse mode discrimination, and thus a loss of some of the advantages of unstable resonators;

(ii) Generation of a thin annular output beam which is a disadvantage for industrial applications.

SUMMARY OF THE INVENTION

It is an object of this invention to provide a laser system which has very low sensitivity to optomechanical instabilities.

It is another object of this invention to provide a laser system which has very low sensitivity to optomechanical instabilities without requiring a corner reflector.

It is another object of this invention to provide a laser system with a large modal volume and high power in a short length.

It is another object of this invention to provide a relatively compact laser system with a very low transverse mode output beam.

The invention relates to stable optical resonators which are of use in a variety of laser systems. The invention relates to a stable resonator for an annular configuration of the lasing medium in a laser system, which comprises as an intracavity element a two stage waxicon or axicon. The resulting laser system is one which gives a high performance and which is of rather compact configuration.

A laser system according to a preferred embodiment of the invention comprises an annular gain region between two concentric tubular coaxial electrodes. The two cylindrical electrodes are held in place by suitable insulating mechanical members. The cylindrical electrodes are of hollow, double-walled construction, thus providing an inner space through which a suitable cooling medium can be circulated. At one of the ends of the annular gain region means are provided for the introduction of a gas or gaseous mixture, and an exit for such gas or gaseous mixture is provided at the other end of the annular gain region. At both ends of the annular gain region there are provided circular windows of a suitable material, such as ZnSe which may be replaced by bellow-sealed mirror mounts. Means are provided to apply RF power to the two electrodes, thus establishing a discharge in the gas mixture in the gain region. On both sides of the gain region there are provided respectively a flat annular feedback mirror perpendicular to the axis of the cylinders, and at the other end, also perpendicular to the axis, a two stage waxicon. At the central region defined by the annular flat mirror there is provided a concave output coupler. The laser beam coming from the active medium has an annular shape and it leaves through the first of the ZnSe windows and reaches the two stage waxicon, where it is converted to a cylindrical beam. The beam is reflected towards the output coupler, from which part of the beam leaves the system as output beam, while part is reflected backwards towards the two stage waxicon, which again converts its shape to an annular one, being directed towards the flat annular feedback mirror. The beam undergoes amplification in the annular gain region, being again reflected back, undergoing further amplification in the gain region, and being directed again at the two stage waxicon, where the shape is again changed to a cylindrical one. The discharge and light amplification take place in the lasing region (gain region). The compact region where the beam is cylindrical is the region where the mode control is performed. In this region, and by virtue of diffraction phenomena, the beam is controlled so as to achieve a low order mode of high quality. This process is enhanced by the diffraction filtering properties of the annular aperture of the active lasing medium. The optical resonator of this system may be looked on as a folded resonator, in which the folding element is the two stage waxicon. In the following there are also provided results of a wave propagation analysis of this system.

BRIEF DESCRIPTION OF THE DRAWINGS

FIG. 5 depicts beam shapes that result from a wave propagation analysis of the invention, including gain saturation of an RF excited $CO_2$—$N_2$—He mixture.

DESCRIPTION OF THE PREFERRED EMBODIMENT

Figure 1:
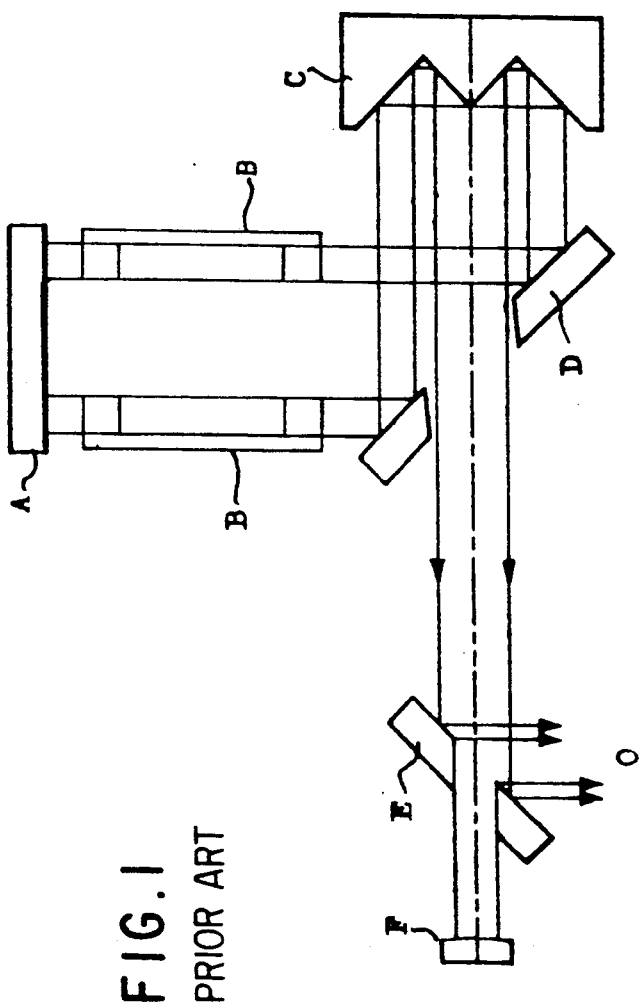
FIG. 1 is a schematic of a configuration of an unstable resonator which comprises an intracavity two stage Waxicon, which is highly sensitive to optomechanical instabilities and to slight misalignments of optical elements of the system.

A more complete appreciation of the invention and many of the attendant advantages thereof will be readily obtained as the same becomes better understood by reference to the following detailed description when considered in connection with the accompanying schematic drawings, wherein:

In FIG. 1, A is a flat feedback mirror, B is an annular lasing medium, C is a Waxicon, D is a flat folding annular mirror, E is a scraper mirror, F is a convex mirror, O is an annular output beam at a low order transverse mode of a prior art device.

Figure 2:
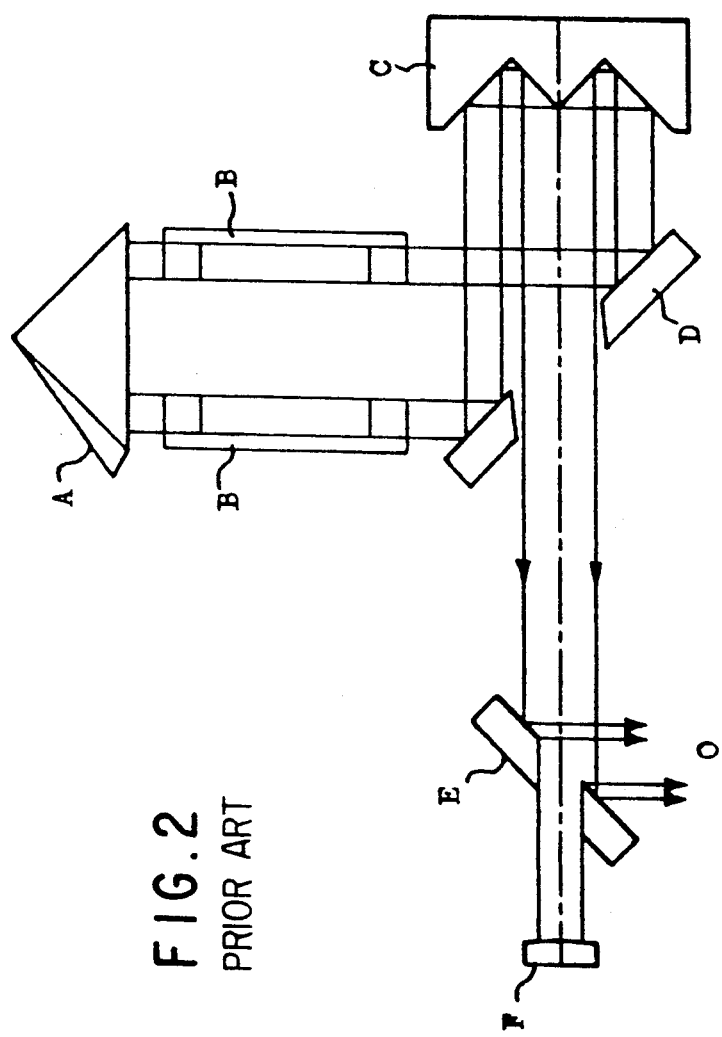
FIG. 2 is a schematic of an unstable resonator with an intracavity two stage Waxicon, which is less sensitive to optomechanical instabilities and to slight misalignments.

In FIG. 2, the elements illustrated are a corner cube retroreflector A, an annular lasing medium B, a Waxicon C, a flat folding mirror D, a scraper mirror E, a Convex mirror F, and an annular output beam O of low order transverse mode of a prior art device.

Figure 3:
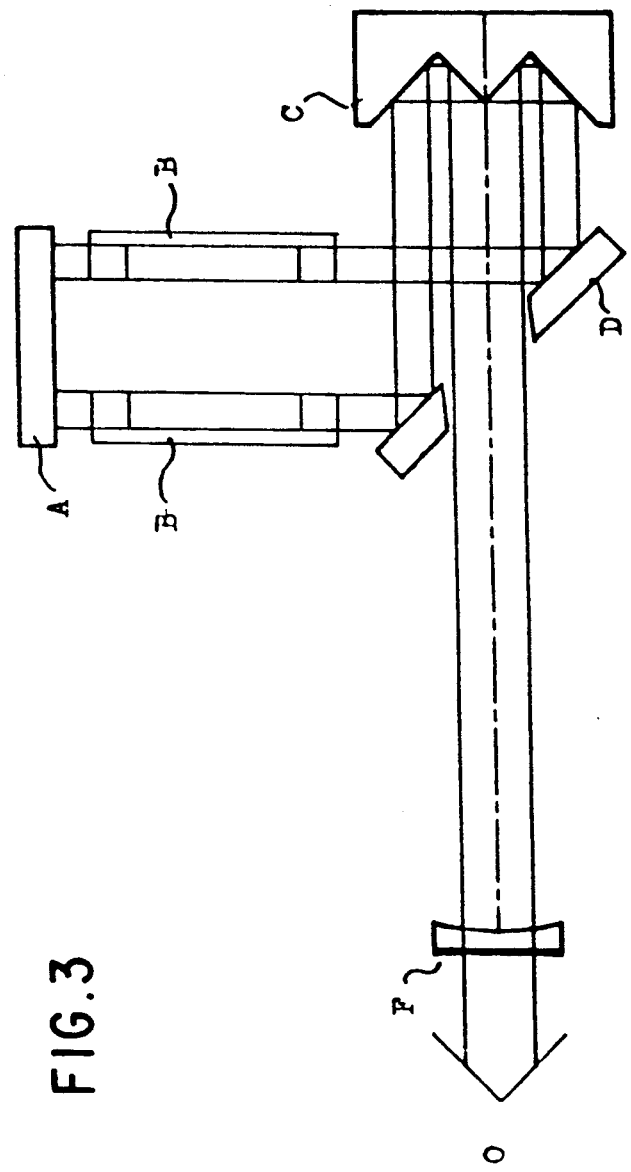
FIG. 3 is a schematic of a stable resonator with an intracavity two stage Waxicon which is substantially less sensitive to optomechanical instabilities and to certain misalignments of the optical elements because of the concave mirror.

The system of FIG. 3 displays a flat feedback mirror A, an annular lasing medium B, a Waxicon C, a flat folding mirror D, a concave output mirror F, and a low order transverse mode order output beam O.

As illustrated with reference to FIG. 4, a laser system of the invention comprises in combination a pair of concentric metal electrodes 1 and 2 between which there is established gain region 5, said concentric electrodes being held by the insulated ring shaped centering members 12 and 3. The two electrodes 1 and 2 are hollow, and thus in each there is provided a channel 4 and 6, respectively, through which a cooling fluid is circulated. The electrodes 1 and 2 are insulated from each other by insulating rings 3 and 12. The lasing gas is admitted to region 5 via entry port 8, and leaves this region via the exit port 13. There are provided two flat ZnSe windows, perpendicular to the axis of the system, one, 14, at the one end, and the other, 15, at the other end of the laser system. These are held in place by window mounts 11, thus isolating the gain region from the outside atmosphere. Means are provided for applying RF power to the eletrodes 1 and 2, establishing a discharge in the gaseous medium in region 5. The lasing process takes place between the annular flat feedback mirror 20 and the concave output coupler 17 through the two stage waxicon 18.

The beam coming from the active medium in region 5 has an annular shape, it passes ZnSe window 15 and reaches the two stage Waxicon 18 at surface 21, from where it is reflected to surface 22, and to output coupler 17. After the two reflections at surface 21 and surface 22, the beam assumes the shape of a cylindrical beam 16. The region along the optical path between surface 22 and output mirror 17 is termed "the compact region", whereas the region along the optical path between surface 21 and mirror 20 is termed "the annular region". The cylindrical beam is directed at the output coupler 17, where at output mirror 17 part of the beam is transmitted and constitutes the output laser beam while part of said beam is reflected backwards towards the two stage Waxicon 18, where it undergoes two reflections, at surface 22 and at surface 21, reverting to the annular shape, which annular beam is propagated in the direction of the feedback mirror 20, passing the annular gain region 5 where it undergoes optical amplification. The beam passes via the second ZnSe window 14, onto feedback mirror 20. The annular beam is again reflected by mirror 20 and passes through region 5, undergoing again optical amplification, being propagated towards the two stage Waxicon 18, where the beam is again transformed fo a compact cylindrical shape. Discharge and light amplification take place in the annular lasing region 5, the region along the optical path between surface 22 and mirror 17 being where the mode control is performed. In region along the optical path between surface 22 and mirror 17, by virtue of diffraction phenomena, the beam is controlled to retain the shape of a low order transversal mode beam.

This process is enhanced by the diffraction filtering properties of the clear aperture of the active medium.

Figure 4:
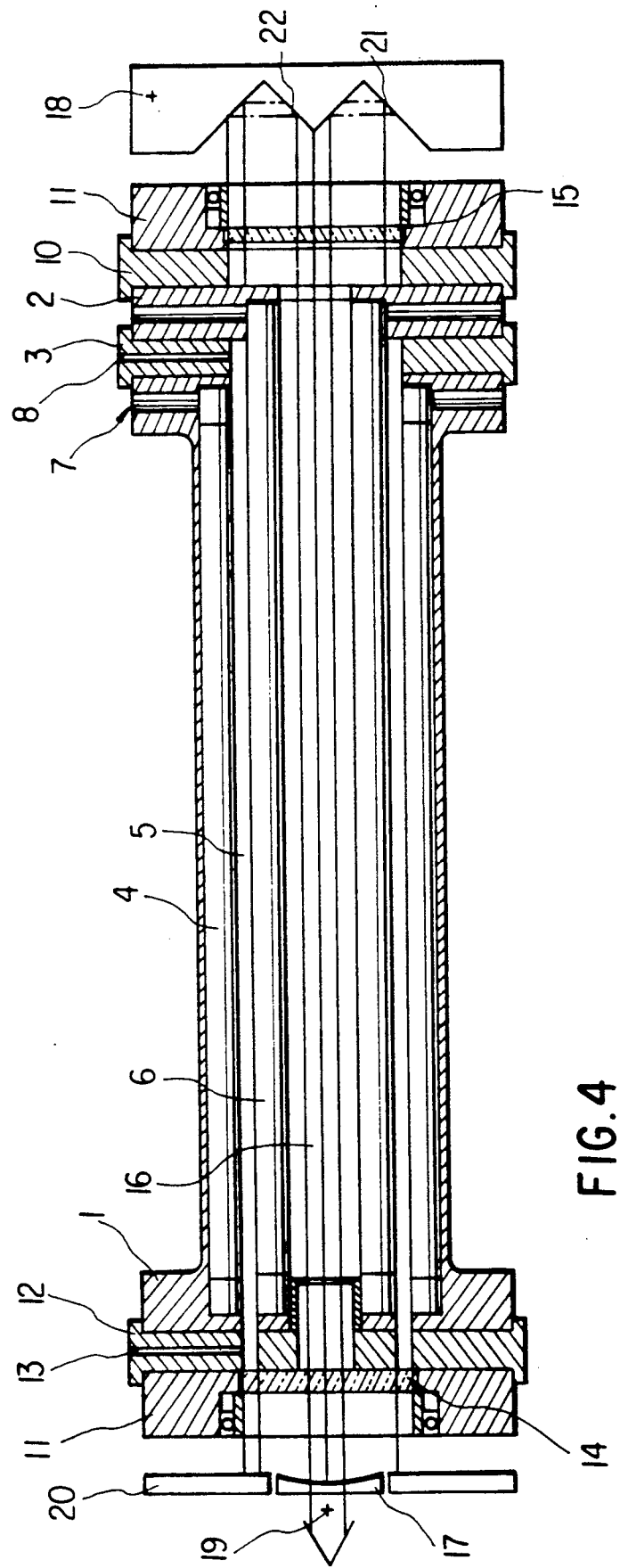
FIG. 4 is a sectional side-view of a laser system of the invention.

The optical resonator of FIG. 4 may be considered as folded resonator, the folding element being the two stage Waxicon 18.

FIG. 5 demonstrates the result of a wave-propagation analysis, including gain saturation of an RF excited $CO_2$—$N_2$—He mixture.

We claim:

1. A stable, compact, cylindrical, laser system, which provides a non-annular low order mode output beam, said beam being insensitive to optomechanical instabilities and misalignments, comprising:
    a pair of coaxial cylindrical electrodes with a radial spacing between an outer surface of an inner electrode and an inner surface of an outer electrode;
    means for cooling said electrodes;
    means for applying RF power to said electrodes;
    means for introducing a lasing gas mixture between said electrodes, thereby providing a lasing medium in the form of an annular cylinder in the space between said electrodes;
    a stable resonator comprising a first end mirror, a two-stage waxicon reflector, and a partially transmissive concave mirror, said resonator being coaxial with said electrodes and producing an output beam of a low mode order, said output beam having an intensity distribution in the far field with a single maximum;
    said first end mirror having an annular shape, a reflecting surface close to and facing said lasing medium, said first end mirror coaxial with said electrodes and at a first end of said electrodes;
    said partially transmissive concave mirror having a radius of curvature, being centered on said axis at said first end of said electrodes, having an outer diameter smaller than an inner diameter of said annular end mirror, acting as a second end mirror and as an output coupling element of said stable resonator; and
    said two-stage Waxicon reflector located close to the second end of said electrodes, centered on said axis, facing said annular end mirror, optically aligned with said annular end mirror.

2. A laser system according to claim 1 wherein said reflecting surface of said annular mirror is flat.

3. A laser system according to claim 1 wherein said reflecting surface of said annular mirror is essentially conical forming an essential axicon centered about said axis.

4. A laser system according to claim 3 wherein said reflecting conical surface is curved in the radial direction.

5. A laser system according to claim 2, wherein:
said electrodes are hollow providing an inner space in each electrode;
said means for cooling includes a fluid circulating through each said inner space.

6. A laser system according to claim 5, wherein:
said lasing medium essentially consists of a $CO_2$—$N_2$—He mixture;

said output beam having near field and far field intensity distributions which are essentially cylindrically symmetric, and essentially cylindrical.

7. A laser system according to claim 1, wherein said two-stage Waxicon is adapted to convert an annular cylindrical beam into a compact cylindrical beam, and wherein the quantitative relations of, the distances between the annular reflector, the two stage Waxicon, the concave mirror, the radius of curvature of said concave mirror, and said radial spacing between said coaxial electrodes, are set so as to produce a very low order single mode operation of said laser system.

8. A laser system according to claim 1 wherein said cylindrical coaxial electrodes are hollow, and said means for cooling includes circulating a cooling fluid through each of said electrodes.

* * * * *